United States Patent
Yamazaki et al.

(10) Patent No.: US 6,284,374 B1
(45) Date of Patent: *Sep. 4, 2001

(54) STRIPPABLE SEMICONDUCTIVE RESIN COMPOSITION AND WIRE AND CABLE

(75) Inventors: Takanori Yamazaki; Kiyoshi Watanabe, both of Ibaraki (JP)

(73) Assignee: Hitachi Cable Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,726

(22) Filed: Mar. 26, 1999

(30) Foreign Application Priority Data

Apr. 3, 1998 (JP) ................................... 10-091688

(51) Int. Cl.⁷ .............................. H01B 5/06; B32B 27/00
(52) U.S. Cl. .................. 428/383; 252/511; 428/372; 428/379; 174/105 SC; 174/106 SC; 174/110 PM; 174/120 SC; 524/495
(58) Field of Search ........................... 252/511; 524/495; 428/379, 375, 383, 372; 174/120 SR, 105 SC, 106 SC, 110 PM, 120 SC (56) References Cited

U.S. PATENT DOCUMENTS

| | | | |
|---|---|---|---|
| 4,150,193 | * 4/1979 | Burns, Jr. ............................... | 428/383 |
| 4,451,536 | * 5/1984 | Barlow et al. ......................... | 428/383 |
| 4,493,787 | * 1/1985 | Taniguchi et al. ..................... | 252/511 |
| 4,767,894 | * 8/1988 | Schombourg ...................... | 174/106 SC |
| 4,909,960 | * 3/1990 | Watanabe et al. ..................... | 252/511 |
| 4,933,107 | * 6/1990 | Watanabe et al. ..................... | 252/511 |
| 5,108,657 | * 4/1992 | Demay et al. ......................... | 252/511 |
| 5,214,091 | * 5/1993 | Tanaka et al. ......................... | 524/425 |
| 5,871,706 | * 2/1999 | Whitehouse ........................... | 524/495 |
| 5,872,177 | * 2/1999 | Whitehouse ........................... | 524/495 |

* cited by examiner

Primary Examiner—Cynthia H. Kelly
Assistant Examiner—J. M. Gray
(74) Attorney, Agent, or Firm—McDermott, Will & Emery (57) ABSTRACT

Disclosed are a strippable semiconductive resin composition adapted for formation of a semiconductive layer having a volume resistivity of not more than 5000 Ω·cm at room temperature, the composition comprising: a polymer component (a), with a number average molecular weight of not less than $3 \times 10^4$ or a weight average molecular weight of not less than $3 \times 10^5$ and a melting point of 60 to 80° C., composed mainly of an ethylene/vinyl acetate copolymer, or a polymer component (b) composed mainly of 99 to 50 parts by weight of the ethylene/vinyl acetate copolymer and 1 to 50 parts by weight of a polyolefin having a melting point of 120° C. or above; and conductive carbon black compounded with the polymer component (a) or (b), and a wire and cable comprising the strippable semiconductive resin composition as an outer semiconductive layer. By virtue of this construction, an outer semiconductive layer can be formed which is excellent in adhesion to an insulator crosslinked by silane grafting/water crosslinking, as well as in strippability.

15 Claims, 1 Drawing Sheet

FIG.1

STRIPPABLE SEMICONDUCTIVE RESIN COMPOSITION AND WIRE AND CABLE

FIELD OF THE INVENTION

The invention relates to a strippable semiconductive resin composition suitable for an outer semiconductive layer of a crosslinked polyolefin-insulated wire and cable, particularly to a strippable semiconductive resin composition suitable for a crosslinked polyolefin-insulated wire and cable crosslinked by silane grafting/water crosslinking, and a wire and cable using the same.

BACKGROUND OF THE INVENTION

Silane grafting/water crosslinking can provide crosslinked polyolefin materials at lower cost than chemical crosslinking using an organic peroxide and hence has been widely used for crosslinking of wire and cable materials.

According to this method, a polymer is graft copolymerized with a vinylalkoxysilane in the presence of a minor amount of an organic peroxide as a graft reaction initiator in a molding machine (for example, an extruder) at a high temperature, and the wire and cable is then exposed to a high temperature and high humidity atmosphere (or hot water) to induce hydrolysis and condensation of the alkoxysilane grafted onto the polymer through the action of a silanol condensation catalyst, such as dibutyltin dilaurate, which has been mixed into or has permeated from the surface of the polyolefin molding into the interior of the polyolefin molding, thus causing crosslinking.

The inner and outer semiconductive layers of plastic-insulated power cables, particularly high voltage crosslinked polyethylene insulated power cables, are generally formed by extrusion. These semiconductive layers should be in intimate contact with a crosslinked polyethylene insulator from the viewpoint of avoiding corona discharge. In treating the terminal of the cable, however, the outer semiconductive layer should be easily stripped without damage to the insulator. For this reason, what is required of the outer semiconductive layer is that the layer is usually in intimate contact with the insulator and if necessary can be easily separated. A composition composed mainly of an ethylene/vinyl acetate copolymer has hitherto been extensively used as a strippable semiconductive resin composition for the outer semiconductive layer.

Use of the outer semiconductive layer on the insulator crosslinked by silane grafting/water crosslinking enhances the adhesion between the insulator and the outer semiconductive layer through the action of a functional group, such as silanol, making it difficult to strip the outer semiconductive layer. When the content of vinyl acetate in the ethylene/vinyl acetate copolymer is increased (for example, to not less than 45% by weight) to facilitate the stripping, acetic acid is likely to be eliminated upon heating at the time of molding. This poses a problem of deteriorated heat resistance and, in addition, discoloration of copper tape as a shielding layer and copper wire as a conductor by the eliminated acetic acid.

SUMMARY OF THE INVENTION

Accordingly, it is an object of the invention to provide a strippable semiconductive resin composition useful for an outer semiconductive layer of plastic insulated power cables, particularly a strippable semiconductive resin composition that can form an outer semiconductive layer excellent in both adhesion to an insulator crosslinked by silane grafting/water crosslinking and strippability, and a wire and cable using the same.

According to the first feature of the invention, a strippable semiconductive resin composition adapted for formation of a semiconductive layer having a volume resistivity of not more than 5000 Ω·cm at room temperature comprises: a polymer component (a) with a number average molecular weight of not less than $3 \times 10^4$ or a weight average molecular weight of not less than $3 \times 10^5$ and a melting point of 60 to 80° C., composed mainly of an ethylene/vinyl acetate copolymer, or a polymer component (b) composed mainly of 99 to 50 parts by weight of the ethylene/vinyl acetate copolymer and 1 to 50 parts by weight of a polyolefin having a melting point of 120° C. or above; and conductive carbon black compounded with the polymer component (a) or (b).

According to the second feature of the invention, a wire and cable comprises: a conductor; an insulator layer for insulating the conductor; and an outer semiconductive layer provided on the periphery of the insulator layer, the outer semiconductive layer comprising a strippable semiconductive resin composition, the strippable semiconductive resin composition comprising a polymer component (a), with a number average molecular weight of not less than $3 \times 10^4$ or a weight average molecular weight of not less than $3 \times 10^5$ and a melting point of 60 to 80° C., composed mainly of an ethylene/vinyl acetate copolymer, or a polymer component (b) composed mainly of 99 to 50 parts by weight of the ethylene/vinyl acetate copolymer and 1 to 50 parts by weight of a polyolefin having a melting point of 120° C. or above, and conductive carbon black compounded with the polymer component (a) or (b), the strippable semiconductive resin composition having a volume resistivity of not more than 5000 Ω·cm at room temperature.

BRIEF DESCRIPTION OF THE DRAWING

The invention will be explained in more detail in conjunction with the appended drawing, wherein.

DESCRIPTION OF THE PREFERRED EMBODIMENTS

Figure 1:
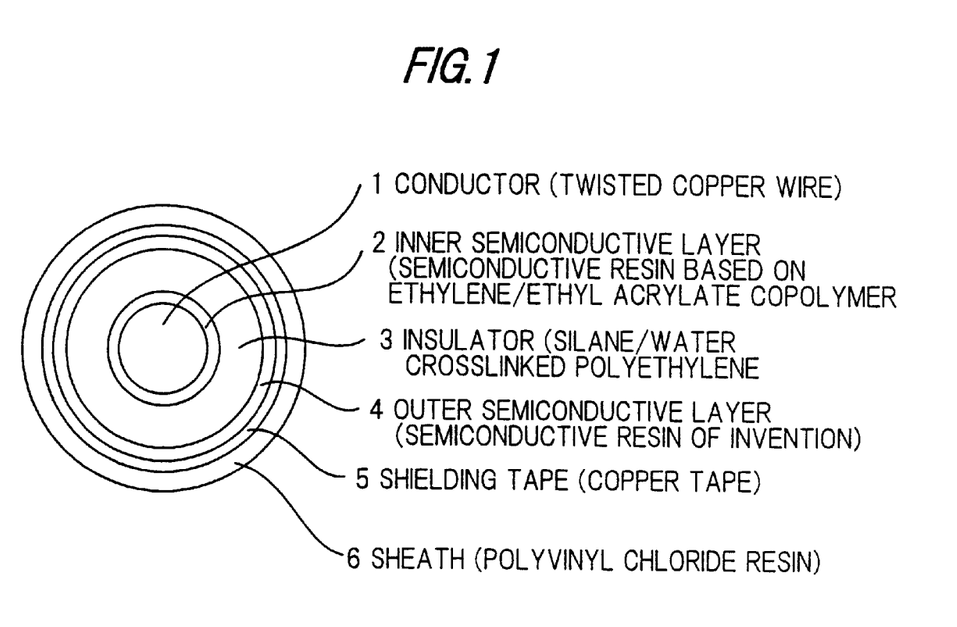
FIG. 1 is a cross sectional view showing a cable in a preferred embodiment according to the invention.

FIG. 1 shows a cable in the preferred embodiment according to the invention. The cable comprises a conductor 1 of stranded copper wires, an inner semiconductive layer 2 of a semiconductive resin based on an ethylene/ethyl acrylate copolymer, an insulator 3 of silane/water crosslinked polyethylene, an outer semiconductive layer 4 of a semiconductive resin according to the invention, a shielding copper tape 5, and a polyvinyl chloride resin sheath 6.

The present inventors have made extensive and intensive studies on strippable semiconductive resin compositions from the viewpoints of strippability and mechanical properties. As a result, they have found that use of an ethylene/vinyl acetate copolymer having a number average molecular weight of not less than $3 \times 10^4$, a weight average molecular weight of not less than $3 \times 10^5$, and a melting point of 60 to 80° C. is useful for providing a strippable semiconductive resin composition possessing good strippability and mechanical properties. The invention has been made based on such finding.

For the semiconductive resin composition, increasing the difference in solubility parameter between the ethylene/ vinyl acetate copolymer and the crosslinked polyethylene, that is, increasing the content of vinyl acetate, is generally considered effective for facilitating stripping of the semiconductive layer from an insulator of crosslinked polyethylene. Mere increase in vinyl acetate content, however, has been unsatisfactory for attaining the purpose. The present inventors have considered that the strippability would be improved by inhibiting the molecular diffusion of the polymer in the interface of the insulator and the semiconductive layer. To this end, the present inventors have attempted to increase the molecular weight of the ethylene/vinyl acetate copolymer. As a result, they have found that application of an ethylene/vinyl acetate copolymer having a large molecular weight synthesized by multi-stage polymerization or the like enables marked improvement in strippability without significantly enhancing the vinyl acetate content.

According to the invention, the melting point of the ethylene/vinyl acetate copolymer should be 60 to 80° C. because a melting point below 60° C. causes sticking between cores at the time of crosslinking in steam or hot water when the core of the cable is wound around a drum by a plurality of tiers. Further, in this case, the deformation becomes significant. This further results in increased corrosion of the copper tape or the wires of copper. On the other hand, a melting point above 80° C. results in high peel strength and in its turn unsatisfactory strippability even when the molecular weight is in the above range.

The number average molecular weight may be measured by osmometry. The weight average molecular weight may be measured by light scattering. The melting point may be measured based on the melting point determined from a crystal melting peak obtained using a differential scanning calorimeter (DSC).

According to the invention, the ethylene/vinyl acetate copolymer (polymer component (a)) may be used alone as the polymer component. Alternatively, a blend comprising 99 to 50 parts by weight of an ethylene/vinyl acetate copolymer and 1 to 50 parts by weight of a polyolefin having a melting point of 120° C. or above (polymer component (b)) may be used as the polymer component. The polyolefin having a melting point of 120° C. or above may be at least one member selected from high density polyethylene, linear polyethylene, and polypropylene. Use of the polymer component (b) can further reduce sticking and deformation at the time of crosslinking of the core of the cable in steam or hot water and the heat deformation in actual use of the cable. The reason why the amount of the polyolefin having a melting point of 120° C. or above blended should be 1 to 50 parts by weight is that when the amount exceeds the upper limit of the above range, the peel resistance to the insulator is excessively high, making it difficult to strip the semiconductive layer.

According to a preferred embodiment of the invention, 1 to 20 parts by weight, based on 100 parts by weight of the polymer component (a) or (b), of a hydrocarbon wax having a volatile loss of less than 2% at 200° C. may be incorporated into the composition. This can lower the viscosity of the semiconductive resin composition and improve the moldability. The volatile loss may be measured by determining a weight reduction by thermogravimetric analysis (TGA) wherein the temperature is raised from room temperature to 200° C. at a rate of 5° C./min. When the volatile loss is not less than 2%, foaming occurs at the time of extrusion, unfavorably resulting in creation of voids within the semiconductive layer or separation in the interface of the semiconductive layer and the insulator.

Hydrocarbon waxes having a volatile loss of less than 2% usable herein include ethylene polymers and polypropylene, having a low molecular weight of not more than 10,000, such as high density polyethylene, medium density polyethylene, low density polyethylene, ethylene/vinyl acetate copolymer, and ethylene/ethyl acrylate copolymer.

Further, according to a preferred embodiment of the invention, an antioxidant having a volatile loss of less than 2% at 200° C. is incorporated into the polymer component (a) or (b). This can impart thermal aging resistance to the composition. As with the volatile loss of the hydrocarbon wax, the volatile loss of the antioxidant may be measured by thermogravimetric analysis. When the volatile loss exceeds 2%, foaming occurs at the time of extrusion, unfavorably resulting in creation of voids within the semiconductive layer or separation in the interface of the semiconductive layer and the insulator. The antioxidant may be at least one member selected from the group consisting of 2, 2-thiodiethylenebis[3-(3, 5-di-t-butyl-4-hydroxyphenyl)propionate], pentaerythrityl-tetrakis[3-(3,5-di-t-butyl-4-hydroxyphenyl)propionate], octadecyl 3-(3, 5-di-t-butyl-4-hydroxyphenyl)propionate, 2, 4-bis-(n-octylthio)-6-(4-hydroxy-3, 5-di-t-butylanilino)-1, 3, 5-triazine, tetrakis(methylenedodecylthiopropionate)methane, distearyl thiopropionate, dimyristyl thiopropionate, and dilauryl thiopropionate. The amount of the antioxidant added is suitably 0.1 to 5 parts by weight based on 100 parts by weight of the polymer component (a) or (b).

Acetylene black, furnace black, ketjzen black and the like may be used as the conductive carbon black. The conductive carbon black should be compounded so that the semiconductive resin composition has a volume resistivity of not more than 5000 Ωcm. The amount of the conductive carbon black compounded for providing the above volume resistivity is not less than 40 parts by weight based on 100 parts by weight of the polymer component for acetylene black or furnace black, and not less than 10 parts by weight based on 100 parts by weight of the polymer component for ketjzen black.

The strippable semiconductive composition according to the invention is extruded on the periphery of an insulator layer of a wire and cable to form an outer semiconductive layer. This outer semiconductive layer may be in a non-crosslinked state or in a crosslinked state. Crosslinking in the same manner as used in crosslinking of the insulator layer is efficient, and crosslinking methods usable herein include chemical crosslinking by addition of an organic peroxide and silane grafting/water crosslinking.

The silane grafting/water crosslinking method generally comprises the steps of: providing a silane-modified polymer obtained by reacting the polymer component of the semiconductive composition and the polymer component of the insulator composition with a silane represented by the general formula wherein R represents an olefinically unsaturated hydrocarbon group or a hydrocarbonoxy group; Y represents a hydrolyzable organic group; and R' represents the R or Y group in the presence of a compound capable of generating free radicals; extruding the silane-modified polymer; and bringing the extrudate into contact with water in the presence of a silanol condensation catalyst to perform crosslinking.

In the silane represented by the general formula RR'SiY$_2$, R represents an olefinically unsaturated hydrocarbon group or a hydrocarbonoxy group, and examples thereof include vinyl, arlyl, butenyl, dichlohexenyl, and cyclopentadienyl groups. Among them, vinyl group is preferred. Y represents a hydrolyzable organic group, and examples thereof include alkoxy groups, such as methoxy, ethoxy, and butoxy groups, acyloxy groups, such as formyloxy, acetoxy, and propionoxy groups, and oxime, alkynoamino, and arylamino groups. Among them, alkoxy groups are preferred. R' represents the R or Y group. Vinylalkoxysilanes are most preferred as the silane, and examples thereof include vinyltrimethoxysilane, vinyltriethoxysilane, vinyltriacetoxysilane, vinyldimethoxymethylsilane, vinyldiethoxymethylsilane, vinylmethoxydimethylsilane, and vinylethoxydimethylsilane. They may be used alone or in combination of two or more. Although the amount of the silane added is not particularly limited, it is preferably 0.1 to 10 parts by weight based on 100 parts by weight of the polymer component.

Free radical generators usable in grafting of the silane onto the polymer component include dicumyl peroxide, 2,5-dimethyl-2,5-di(t-butylperoxy)hexane, 2,5-dimethyl-2, 5-di(t-butylperoxy)hexyne-3, α, α'-bis(t-butylperoxy-m-isopropyl)benzene, butylcumyl peroxide, and isopropylcumyl-t-butyl peroxide. They may be used alone or in combination of two or more. The amount of the free radical generator added is preferably 0.05 to 0.15 part by weight based on 100 parts by weight of the polymer component. When the amount is less than 0.05 part by weight, the degree of crosslinking is likely to be unsatisfactory. On the other hand, when the amount exceeds 0.15 part by weight, voids attributable to decomposition products of the free radical initiator are likely to be created within the insulator.

In order to accelerate the crosslinking, a silanol condensation catalyst is added to the polymer component or is allowed to penetrate from the surface of the molding into the polymer component. Silanol condensation catalysts usable herein include carboxylates of metals, such as tin, zinc, iron, lead, and cobalt, organic bases, inorganic acids, and organic acids. Specific examples thereof include dibutyltin dilaurate, dibutyltin diacetate, dibutyltin dioctanoate, stannous acetate, stannous caprylate, lead naphthenate, zinc caprylate, cobalt naphthenate, ethylamine, dibutylamine, hexylamine, pyridine, inorganic acids, such as sulfuric acid and hydrochloric acid, and organic acids, such as toluenesulfonic acid, acetic acid, stearic acid, and maleic acid. The amount of the silanol condensation catalyst added is not particularly limited. However, the amount is generally 0.01 to 0.1 part by weight based on 100 parts by weight of the polymer component.

Moldings containing a silanol condensation catalyst may be produced by the following two methods. One method is called "two-shot method" or "sioplus method" which comprises preparing a master batch of the polymer having a high silanol condensation catalyst content and feeding the master batch, together with necessary components, such as a previously prepared silane-grafted polymer, a conductive carbon black, into an extruder to perform molding. The other method is called "one-shot method" or "monosil method" which comprises feeding compounding ingredients including a silane, a silanol condensation catalyst and a free radical generator into a polymer (optionally containing conductive carbon black and other ingredients) within an extruder and simultaneously performing grafting of the silane onto the polymer and molding in one extruder. Any of the above methods may be used in the invention.

EXAMPLES

The following examples further illustrate the invention.

Example 1

[Inner semiconductive layer]

80 parts by weight of an ethylene/ethyl acrylate copolymer (ethyl acrylate content 15% by weight, melt index 0.5), 20 parts by weight of linear polyethylene (melting point 126° C., density 0.945, melt index 0.8), 1 part by weight of pentaerythrityl-tetrakis[3-(3,5-di-t-butyl-4-hydroxyphenyl) propionate] as an antioxidant, and 60 parts by weight of acetylene black were mixed and kneaded together in a Banbury mixer, and the blend thus obtained was pelletized and introduced into a 65-mm extruder I set at 200° C.

[Insulator]

100 parts by weight of a linear polyethylene (granular form) having a density of 0.920 g/cm$^3$ and a melt index of 0.8 g/10 min, 1 part by weight of 2, 2-thio-diethylenebis[3-(3, 5-di-t-butyl-4-hydroxyphenyl)propionate] as an antioxidant, an 1.0 part by weight of vinyltrimethoxysilane, 0.1 part by weight of dicumyl peroxide (free radical generator (I)) as a free radical generator, and 0.05 part by weight of dibutyltin dilaurate were introduced into a 130-mm extruder II set at 200° C. In introducing these materials, the antioxidant, the free radical generator, and the dibutyltin dilaurate were dissolved in the vinyltrimethoxysilane, and the solution was introduced into the extruder through the bottom of a hopper provided in the extruder.

[Outer semiconductor layer]

100 parts by weight of an ethylene/vinyl acetate copolymer having a melting point of 60° C., a number average molecular weight (Mn) of $3 \times 10^4$, and a weight average molecular weight (Mw) of $3 \times 10^5$ (ethylene/vinyl acetate copolymer (I)), 1 part by weight of pentaerythrityl-tetrakis [3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP (dibutyl phthalate) absorption number 160 ml/100 g) were mixed and kneaded together in a Banbury mixer, and the blend thus obtained was pelletized and introduced into a 75-mm extruder III set at 200° C.

The compounds discharged from the extruders I, II, and III were guided to a common head and extruded onto a twisted wire (sectional area 60 mm$^2$) of annealed copper to form a 0.7 mm-thick inner semiconductive layer, a 4.5 mm-thick layer, and a 0.7 mm-thick outer semiconductive layer, followed by standing in an atmosphere of 95% steam at 80° C. for 24 hr to cause crosslinking. Thereafter, a copper tape for insulator shielding, and a vinyl sheath were applied to prepare a crosslinked polyethylene insulated electric cable.

Example 2

An electric cable was prepared in the same manner as in Example 1, except that the outer semiconductive layer was formed from 100 parts by weight of an ethylene/vinyl acetate copolymer having a melting point of 72° C., a number average molecular weight (Mn) of $5 \times 10^4$, and a weight average molecular weight (Mw) of $4.5 \times 10^5$ (ethylene/vinyl acetate copolymer (II)), 1 part by weight of pentaerythrityl-tetrakis[3-(3,5-di-t-butyl-4-hydroxyphenyl) propionate] (volatile loss 0.1%) (antioxidant (I)), and 60 parts by weight of acetylene black (average particle diameter 35 nm, iodine adsorption number 93 mg/g, DBP absorption number 160 ml/100 g).

Example 3

An electric cable was prepared in the same manner as in Example 1, except that the outer semiconductive layer was formed from 100 parts by weight of an ethylene/vinyl acetate copolymer having a melting point of 72° C., a number average molecular weight (Mn) of $7\times10^4$, and a weight average molecular weight (Mw) of $6\times10^5$ (ethylene/vinyl acetate copolymer (III)), 1 part by weight of 2,2-thio-diethylenebis[3-(3,5-di-t-butyl-4-hydroxyphenyl)propionate] (volatile loss 0.1%) (antioxidant (II)), and 60 parts by weight of acetylene black (average particle diameter 35 nm, iodine adsorption number 93 mg/g, DBP absorption number 160 ml/100 g).

Example 4

An electric cable was prepared in the same manner as in Example 1, except that the outer semiconductive layer was formed from 50 parts by weight of an ethylene/vinyl acetate copolymer having a melting point of 60° C., a number average molecular weight (Mn) of $3\times10^4$, and a weight average molecular weight (Mw) of $3\times10^5$ (ethylene/vinyl acetate copolymer (I)), 50 parts by weight of a high density polyethylene having a melting point of 132° C., a density of 0.952 g/cm$^3$, and a melt index of 0.1, 0.5 part by weight of pentaerythrityl-tetrakis[3-(3,5-di-t-butyl-4-hydroxyphenyl)propionate] volatile loss 0.1%) (antioxidant (I)), 0.5 part by weight of tetrakis(methylene thiopropionate)methane (volatile loss 0.1%) (antioxidant (III)), and 60 parts by weight of acetylene black (average particle diameter 35 nm, iodine adsorption number 93 mg/g, DBP absorption number 160 ml/100 g).

Example 5

An electric cable was prepared in the same manner as in Example 1, except that the outer semiconductive layer was formed from 80 parts by weight of an ethylene/vinyl acetate copolymer having a melting point of 72° C., a number average molecular weight (Mn) of $5\times10^4$, and a weight average molecular weight (Mw) of $4.5\times10^5$ (ethylene/vinyl acetate copolymer (II)), 20 parts by weight of a linear polyethylene having a melting point of 132° C., a density of 0.925 g/cm$^3$, and a melt index of 4, 0.5 part by weight of 2,2-thio-diethylenebis[3-(3,5-di-t-butyl-4-hydroxyphenyl)propionate] (volatile loss 0.1%) (antioxidant (II)), 0.5 part by weight of dilauryl thiopropionate (volatile loss 1.5%) (antioxidant (IV)), and 60 parts by weight of acetylene black (average particle diameter 35 nm, iodine adsorption number 93 mg/g, DBP absorption number 160 ml/100 g).

Example 6

An electric cable was prepared in the same manner as in Example 1, except that the outer semiconductive layer was formed from 80 parts by weight of an ethylene/vinyl acetate copolymer having a melting point of 60° C., a number average molecular weight (Mn) of $3\times10^4$, and a weight average molecular weight (Mw) of $3\times10^5$ (ethylene/vinyl acetate copolymer (I)), 20 parts by weight of polypropylene having a melting point of 167° C., a density of 0.89 g/cm$^3$, and a melt index of 0.8, 1 part by weight of pentaerythrityl-tetrakis[3-(3,5-di-t-butyl-4-hydroxyphenyl)propionate] (volatile loss 0.1%) (antioxidant (I)), and 80 parts by weight of furnace black (average particle diameter 46 nm, iodine adsorption number 40 mg/g, DBP absorption number 76 ml/100 g).

Example 7

An electric cable was prepared in the same manner as in Example 1, except that the outer semiconductive layer was formed from 80 parts by weight of an ethylene/vinyl acetate copolymer having a melting point of 72° C., a number average molecular weight (Mn) of $5\times10^4$, and a weight average molecular weight (Mw) of $4.5\times10^5$ (ethylene/vinyl acetate copolymer (II)), 20 parts by weight of a high density polyethylene having a melting point of 132° C., a density of 0.952 g/cm$^3$, and a melt index of 0.1, 20 parts by weight of a high density polyethylene wax (volatile loss 0.1%) having a molecular weight of 4000, 1 part by weight of pentaerythrityl-tetrakis[3-(3,5-di-t-butyl-4-hydroxyphenyl)propionate] (volatile loss 0.1%) (antioxidant (I)), and 80 parts by weight of furnace black (average particle diameter 46 nm, iodine adsorption number 40 mg/g, DBP absorption number 76 ml/100 g).

Example 8

An electric cable was prepared in the same manner as in Example 1, except that the outer semiconductive layer was formed from 80 parts by weight of an ethylene/vinyl acetate copolymer having a melting point of 72° C., a number average molecular weight (Mn) of $5\times10^4$, and a weight average molecular weight (Mw) of $4.5\times10^5$ (ethylene/vinyl acetate copolymer (II)), 20 parts by weight of a high density polyethylene having a melting point of 132° C., a density of 0.952 g/cm$^3$, and a melt index of 0.1, 20 parts by weight of a low density polyethylene wax (volatile loss 1.7%) having a molecular weight of 2000, 1 part by weight of pentaerythrityl-tetrakis[3-(3,5-di-t-butyl-4-hydroxyphenyl)propionate] (volatile loss 0.1%) (antioxidant (I)), and 80 parts by weight of furnace black (average particle diameter 46 nm, iodine adsorption number 40 mg/g, DBP absorption number 76 ml/100 g).

Example 9

An electric cable was prepared in the same manner as in Example 1, except that the outer semiconductive layer was formed from 80 parts by weight of an ethylene/vinyl acetate copolymer having a melting point of 72° C., a number average molecular weight (Mn) of $5\times10^4$, and a weight average molecular weight (Mw) of $4.5\times10^5$ (ethylene/vinyl acetate copolymer (II)), 20 parts by weight of a high density polyethylene having a melting point of 132° C., a density of 0.952 g/cm$^3$, and a melt index of 0.1, 15 parts by weight of an ethylene/vinyl acetate copolymer wax having a molecular weight of 6700 (vinyl acetate content 11.5%, volatile loss 0.3%), 1 part by weight of pentaerythrityl-tetrakis[3-(3,5-di-t-butyl-4-hydroxyphenyl)propionate] (volatile loss 0.1%) (antioxidant (I)), and 80 parts by weight of furnace black (average particle diameter 46 nm, iodine adsorption number 40 mg/g, DBP absorption number 76 ml/100 g).

Example 10

An electric cable was prepared in the same manner as in Example 1, except that the outer semiconductive layer was formed from 80 parts by weight of an ethylene/vinyl acetate copolymer having a melting point of 72° C., a number average molecular weight (Mn) of $5\times10^4$, and a weight average molecular weight (Mw) of $4.5\times10^5$ (ethylene/vinyl acetate copolymer (II)), 20 parts by weight of a high density polyethylene having a melting point of 132° C., a density of 0.952 g/cm$^3$, and a melt index of 0.1, 20 parts by weight of a high density polyethylene wax (volatile loss 0.1%) having a molecular weight of 4000, 1 part by weight of pentaerythrityl-tetrakis[3-(3,5-di-t-butyl-4-hydroxyphenyl)propionate] (volatile loss 0.1%) (antioxidant (I)), 1.0 part by weight of vinyltrimethoxysilane, 0.1 part by weight of dicumyl peroxide (free radical generator (I)), 0.05 part by weight of dibutyltin dilaurate, and 80 parts by weight of furnace black (average particle diameter 46 nm, iodine adsorption number 40 mg/g, DBP absorption number 76 ml/100 g). In introducing the above materials, the antioxidant, the free radical generator, and dibutyltin dilaurate were dissolved in the vinyltrimethoxysilane, and the solution was introduced into the extruder through the bottom of a hopper provided in the extruder.

Example 11

An electric cable was prepared in the same manner as in Example 10, except that the outer semiconductive layer was formed from 80 parts by weight of an ethylene/vinyl acetate copolymer having a melting point of 72° C., a number average molecular weight (Mn) of $5 \times 10^4$, and a weight average molecular weight (Mw) of $4.5 \times 10^5$ (ethylene/vinyl acetate copolymer (II)), 20 parts by weight of a high density polyethylene having a melting point of 132° C., a density of 0.952 g/cm$^3$, and a melt index of 0.1, 15 parts by weight of an ethylene/vinyl acetate copolymer wax having a molecular weight of 6700 (vinyl acetate content 11.5%, volatile loss 0.3%), 1 part by weight of 2,2-thio-diethylenebis[3-(3,5-di-t-butyl-4-hydroxyphenyl)propionate] (volatile loss 0.1%) (antioxidant (II)), 1.0 part by weight of vinyltrimethoxysilane, 0.08 part by weight of 2,5-dimethyl-2,5-di(t-butylperoxy)hexane (free radical generator (II)), 0.05 part by weight of dibutyltin dilaurate, and 80 parts by weight of furnace black (average particle diameter 46 nm, iodine adsorption number 40mg/g, DBP absorption number 76 ml/100 g).

Comparative Example 1

An electric cable was prepared in the same manner as in Example 1, except that the outer semiconductive layer was formed from 100 parts by weight of an ethylene/vinyl acetate copolymer having a melting point of 60° C., a number average molecular weight (Mn) of $2.5 \times 10^4$, and a weight average molecular weight (Mw) of $2.5 \times 10^5$ (ethylene/vinyl acetate copolymer (IV)), 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 2

An electric cable was prepared in the same manner as in Example 1, except that the outer semiconductive layer was formed from 100 parts by weight of an ethylene/vinyl acetate copolymer having a melting point of 90° C., a number average molecular weight (Mn) of $5 \times 10^4$, and a weight average molecular weight (Mw) of $5 \times 10^5$ (ethylene/vinyl acetate copolymer (V)), 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 3

An electric cable was prepared in the same manner as in Example 1, except that the outer semiconductive layer was formed from 100 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 4

An electric cable was prepared in the same manner as in Example 1, except that the outer semiconductive layer was formed from 100 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 1 part by weight of pentaerythrityl-tetrakis[3-(3,5-di-t-butyl-4-hydroxyphenyl)propionate] (volatile loss 0.1%) (antioxidant (I)), and 40 parts by weight of acetylene black (average particle diameter 35 nm, iodine adsorption number 93 mg/g, DBP absorption number 160 ml/100 g).

Comparative Example 5

An electric cable was prepared in the same manner as in Example 1, except that the outer semiconductive layer was formed from 80 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 20 parts by weight of a low density polyethylene, 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 6

An electric cable was prepared in the same manner as in Example 1, except that the outer semiconductive layer was formed from 40 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 60 parts by weight of a low density polyethylene, 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 7

An electric cable was prepared in the same manner as in Example 1, except that the outer semiconductive layer was formed from 80 parts by weight of an ethylene/vinyl acetate copolymer having a melting point of 50° C., a number average molecular weight (Mn) of $3 \times 10^4$ and a weight average molecular weight (Mw) of $3 \times 10^5$ (ethylene/vinyl acetate copolymer (VI)), 20 parts by weight of a low density polyethylene, 30 parts by weight of a high density polyethylene wax having a molecular weight of 4000 (volatile loss 0.1%), 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 8

An electric cable was prepared in the same manner as in Example 1, except that the outer semiconductive layer was formed from 80 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 20 parts by weight of a low density polyethylene, 20 parts by weight of a polyethylene glycol having a molecular weight of 4000 (volatile loss 3%), 1 part by weight of pentaerythrityl-tetrakis[3-(3,5-di-t-butyl-4-hydroxyphenyl)propionate] (volatile loss 0.1%) (antioxidant (I)), and 60 parts by weight of acetylene black (average particle diameter 35 nm, iodine adsorption number 93 mg/g, DBP absorption number 160 ml/100 g).

Comparative Example 9

An electric cable was prepared in the same manner as in Example 1, except that the outer semiconductive layer was formed from 80 parts by weight of an ethylene/vinyl acetate copolymer having a melting point of 50° C., a number average molecular weight (Mn) of $3 \times 10^4$, and a weight average molecular weight (Mw) of $3 \times 10^5$ (ethylene/vinyl acetate copolymer (VI)), 20 parts by weight of a low density polyethylene, 1 part by weight of di-dodecyl-thio-di-propionate (volatile loss 3%) (antioxidant (V)), and 60 parts by weight of acetylene black (average particle diameter 35 nm, iodine adsorption number 93 mg/g, DBP absorption number 160 ml/100 g).

For Examples 1 to 11 and Comparative Examples 1 to 9, the chemical composition, together with evaluation results, is summarized in Tables 1, 2, and 3. The evaluation was carried out as follows. The extrudability was visually evaluated. For the deformation and the sticking upon crosslinking, the cable was wound around a 2-mΦ drum by eight tiers, heated in steam of 80° C. for 24 hr, and inspected for the deformation of the outer semiconductive layer of the cable and sticking of outer semiconductive layers to each other. When neither deformation nor sticking was observed, the cable was evaluated as acceptable. The peel strength is a force necessary for stripping the outer semiconductive layer from the cable, and measured at room temperature according to the procedure set forth in AEIC-CS 5. When the peel strength was 0.5 to 4 kg/½ in. as measured according to this method, the cable was evaluated as acceptable. The heat deformation was measured according to the procedure set forth in JIS C 3005. When the heat deformation of the cable sample at 120° C. was not more than 25%, the cable was evaluated as good; and when the heat deformation exceeded 25%, the cable was evaluated as no good. The volume resistivity was measured for the cable. When the volume resistivity was not more than 5000 Ω·cm at room temperature and not more than 50000 Ω·cm at 90° C., the cable was evaluated as acceptable. The Mooney viscosity ($ML_{1+4}$) was measured with a Mooney viscometer at a temperature of 200° C. When the Mooney viscosity is not more than 50, the extrudability is good. For the discoloration or corrosion of the copper tape for insulator shielding, the cable was cut into a length of 10 m, both ends of the cable was hermetically sealed, the cable was then energized, and room temperature –105° C. (conductor temperature) heat cycles (on for 4 hr and off for 4 hr) were repeated 100 times. Thereafter, the cable was dismantled and visually inspected. When the conductor temperature was 105° C., the temperature of the surface of the outer semiconductive layer was 75° C.

TABLE 1

| ITEM | EXAMPLE 1 | EXAMPLE 2 | EXAMPLE 3 | EXAMPLE 4 | EXAMPLE 5 |
|---|---|---|---|---|---|
| Components | | | | | |
| Ethylene/vinyl acetate copolymer (I) | 100 | — | — | 50 | — |
| Ethylene/vinyl acetate copolymer (II) | — | 100 | — | — | 80 |
| Ethylene/vinyl acetate copolymer (III) | — | — | 100 | — | — |
| High density polyethylene | — | — | — | 50 | — |
| Linear polyethylene | — | — | — | — | 20 |
| Antioxidant (I) | 1 | 1 | — | 0.5 | — |
| Antioxidant (II) | — | — | 1 | — | 0.5 |
| Antioxidant (III) | — | — | — | 0.5 | — |
| Antioxidant (IV) | — | — | — | — | 0.5 |
| Acetylene black | 60 | 60 | 60 | 60 | 60 |
| Evaluation results | | | | | |
| Appearance of extrudate | GOOD | GOOD | GOOD | GOOD | GOOD |
| Deformation and sticking during crosslinking | Acceptable | Acceptable | Acceptable | Acceptable | Acceptable |
| Peel strength, kg/½ in | 3.0 | 2.3 | 2.0 | 4.0 | 2.7 |
| Thermal deformation, values within parentheses, in % | GOOD (23) | GOOD (20) | GOOD (18) | GOOD (13) | GOOD (18) |
| Volume resistivity | Acceptable | Acceptable | Acceptable | Acceptable | Acceptable |
| Mooney viscosity, ML1 + 4 | 37 | 45 | 48 | 42 | 44 |
| Discoloration or corrosion of copper tape | Free | Free | Free | Free | Free |

TABLE 2

| ITEM | EXAMPLE 6 | EXAMPLE 7 | EXAMPLE 8 | EXAMPLE 9 | EXAMPLE 10 | EXAMPLE 11 |
|---|---|---|---|---|---|---|
| Components | | | | | | |
| Ethylene/vinyl acetate copolymer (I) | 80 | — | — | — | — | — |
| Ethylene/vinyl acetate copolymer (II) | — | 80 | 80 | 80 | 80 | 80 |

TABLE 2-continued

| ITEM | EXAMPLE 6 | EXAMPLE 7 | EXAMPLE 8 | EXAMPLE 9 | EXAMPLE 10 | EXAMPLE 11 |
|---|---|---|---|---|---|---|
| High density polyethylene | — | 20 | 20 | 20 | 20 | 20 |
| Polypropylene | 20 | — | — | — | — | — |
| High density polyethylene wax | — | 20 | — | — | 20 | — |
| Low density polyethylene wax | — | — | 20 | — | — | — |
| Ethylene/vinyl acetate copolymer wax | — | — | — | 15 | — | 15 |
| Antioxidant (I) | 1 | 1 | 1 | 1 | 1 | — |
| Antioxidant (II) | — | — | — | — | — | 1 |
| Vinyl trimethoxysilane | — | — | — | — | 1.0 | 1.0 |
| Free radical generator (I) | — | — | — | — | 0.1 | — |
| Free radical generator (II) | — | — | — | — | — | 0.08 |
| Dibutyltin dilaurate | — | — | — | — | 0.05 | 0.05 |
| Furnace black | 80 | 80 | 80 | 80 | 80 | 80 |
| Evaluation results | | | | | | |
| Appearance of extrudate | GOOD | GOOD | GOOD | GOOD | GOOD | GOOD |
| Deformation and sticking during crosslinking | Acceptable | Acceptable | Acceptable | Acceptable | Acceptable | Acceptable |
| Peel strength, kg/½ in | 1.7 | 2.0 | 2.2 | 2.0 | 2.3 | 2.8 |
| Thermal deformation, values within parentheses, in % | GOOD (8) | GOOD (11) | GOOD (14) | GOOD (15) | GOOD (7) | GOOD (8) |
| Volume resistivity | Acceptable | Acceptable | Acceptable | Acceptable | Acceptable | Acceptable |
| Mooney viscosity, ML1 + 4 | 38 | 35 | 33 | 30 | 28 | 33 |
| Discoloration or corrosion of copper tape | Free | Free | Free | Free | Free | Free |

TABLE 3

| ITEM | EXAMPLE 1 | EXAMPLE 2 | EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|---|---|---|
| Components | | | | | | | | | |
| Ethylene/vinyl acetate copolymer (IV) | 100 | — | — | — | — | — | — | — | — |
| Ethylene/vinyl acetate copolymer (V) | — | 100 | — | — | — | — | — | — | — |
| Ethylene/vinyl acetate copolymer (VI) | — | — | 100 | 100 | 80 | 40 | 80 | 80 | 80 |
| Low density polyethylene | — | — | — | — | 20 | 60 | — | 20 | 20 |
| High density polyethylene wax | — | — | — | — | — | — | 30 | — | — |
| Polyethylene glycol | — | — | — | — | — | — | — | 20 | — |
| Antioxidant (I) | 1 | 1 | 1 | 1 | 1 | 1 | 1 | 1 | — |
| Antioxidant (V) | — | — | — | — | — | — | — | — | 1 |
| Acetylene black | 60 | 60 | 40 | 60 | 60 | 60 | 60 | 60 | 60 |
| Evaluation results | | | | | | | | | |
| Appearance | GOOD | GOOD | GOOD | GOOD | GOOD | GOOD | GOOD | No | No |

TABLE 3-continued

| | EXAMPLE COMPARATIVE EXAMPLE | | | | | | | | |
|---|---|---|---|---|---|---|---|---|---|
| ITEM | 1 | 2 | 3 | 4 | 5 | 6 | 7 | 8 | 9 |
| of extrudate Deformation and sticking during crosslinking | Unacceptable | Acceptable | Unacceptable | Unacceptable | Unacceptable | Unacceptable | Unacceptable | good Acceptable | good Acceptable |
| Peel strength, kg/½ in | Unstrippable | Unstrippable | GOOD | GOOD | GOOD | Unstrippable | Unstrippable | GOOD | GOOD |
| Thermal deformation, values within parentheses, in % | No good (42) | Good (14) | No good (52) | No good (74) | No good (47) | No good (53) | No good (64) | No good (54) | Good (11) |
| Volume resistivity | Acceptable | Acceptable | Acceptable | Unacceptable | Acceptable | Acceptable | Acceptable | Acceptable | Acceptable |
| Mooney viscosity, ML1 + 4 | 32 | 53 | 37 | 27 | 42 | 58 | 22 | 23 | 47 |
| Discoloration or corrosion of copper tape | Free | Free | Found | Found | Free | Free | Free | Free | Free |

All the samples of Examples 1 to 11 having compositions falling within the scope of the invention had good strippability. For the samples of Examples 1 to 3 using an ethylene/vinyl acetate copolymer having a molecular weight and a melting point falling within the respective ranges specified in claim 1, the appearance of the extrudate was good, and the peel strength and the heat deformation were small. For the samples of Examples 4 to 6 respectively containing high density polyethylene, linear polyethylene, or polypropylene having a melting point of 120° C. or above as the polyolefin, the heat deformation was additionally reduced. Also for the samples of Examples 7 to 9 containing a hydrocarbon wax having low volatile loss, the extrudability was good, and the Mooney viscosity was also satisfactorily low. For the samples of Examples 10 and 11 of crosslinked type, the heat deformation was also small. Further, for all the samples containing an antioxidant and a hydrocarbon wax having a low volatile loss of less than 2%, no foaming occurred, and the appearance of the extrudate was good.

On the other hand, for the sample of Comparative Example 1 using an ethylene/vinyl acetate copolymer having a small molecular weight outside the molecular weight range specified in the invention, the outer semiconductive layer was unstrippable, and the heat deformation was also large. For the sample of Comparative Example 2 using an ethylene/vinyl acetate copolymer having a molecular weight falling within the molecular weight range specified in the invention and a higher melting point than the melting point range specified in the invention, the outer semiconductive layer was unstrippable, and the Mooney viscosity was slightly high. For the sample of Comparative Example 3 using an ethylene/vinyl acetate copolymer having lower molecular weight and melting point than the molecular weight and melting point ranges specified in the invention, the deformation/stickiness upon crosslinking was unacceptable, the heat deformation was no good, and the discoloration of the copper tape occurred. For the sample of Comparative Example 4 using an ethylene/vinyl acetate copolymer having lower molecular weight and melting point than the molecular weight and melting point ranges specified in the invention and having a low acetylene black content, the volume resistivity was high and unacceptable. For the sample of Comparative Example 5 wherein a polyethylene having a lower melting point was blended, the deformation upon crosslinking and the heat deformation were unacceptable. For the sample of Comparative Example 6 wherein the amount of the polyethylene having a low melting point blended exceeded 50 parts by weight, additionally, the outer semiconductive layer was unstrippable. For the sample of Comparative Example 7 wherein the amount of the hydrocarbon wax added exceeded the upper limit of the hydrocarbon wax content range specified in the invention, the heat deformation and the strippability were poor. For the samples of Comparative Examples 8 and 9 wherein a wax or an antioxidant having a large volatile loss was added, foaming occurred in the interface of the interior of the semiconductive layer and the insulator at the time of extrusion.

Thus, according to the invention, a strippable semiconductive resin composition is provided which is excellent in adhesion to an insulator crosslinked by silane grafting/water crosslinking, as well as in strippability, and, in addition, possesses excellent extrudability and heat deformation properties. Therefore, the invention is of very large industrial value.

The invention has been described in detail with particular reference to preferred embodiments, but it will be understood that variations and modifications can be effected within the scope of the invention as set forth in the appended claims.

What is claimed is:

1. A strippable semiconductive resin composition adapted for formation of a semiconductive layer which is directly in contact with an insulation of a crosslinked polyolefin-insulated wire and cable, said semiconductive layer having a volume resistivity of not more than 5000 Ω·cm at room temperature, said composition comprising: a polymer component (a), with a number average molecular weight of not less than $3 \times 10^4$ or a weight average molecular weight of not less than $3 \times 10^5$ and a melting point of 60° C. to 80° C., composed mainly of an ethylene/vinyl acetate copolymer, or a polymer component (b) composed mainly of 99 to 50 parts by weight of the ethylene/vinyl acetate copolymer and 1 to 50 parts by weight of a polyolefin having a melting point of 120° C. or above; and conductive carbon black compounded with the polymer component (a) or (b).

2. The strippable semiconductive resin composition according to claim 1, wherein the polyolefin having a melting point of 120° C. or above is at least one member selected from the group consisting of high density polyethylene, linear polyethylene, and polypropylene.

3. The strippable semiconductive resin composition according to claim 1, which further comprises 1 to 20 parts by weight, based on 100 parts by weight of the polymer component (a) or (b), of a hydrocarbon wax having a volatile loss of less than 2% at 200° C.

4. The strippable semiconductive resin composition according to claim 3, wherein the hydrocarbon wax is at least one member selected from the group consisting of high density polyethylene, medium density polyethylene, low density polyethylene, ethylene/vinyl acetate copolymer, ethylene/ethyl acrylate copolymer, and other ethylene polymers and polypropylene, said polymers having a molecular weight of not more than 10,000.

5. The strippable semiconductive resin composition according to claim 1, which further comprises an antioxidant having a volatile loss of less than 2% at 200° C.

6. The strippable semiconductive resin composition according to claim 5, wherein the antioxidant is at least one member selected from the group consisting of 2,2-thio-diethylenebis[3-(3, 5-di-t-butyl-4-hydroxyphenyl) propionate], pentaerythrityl-tetrakis[3-(3,5-di-t-butyl-4-hydroxyphenyl)propionate], octadecyl 3-(3, 5-di-t-butyl-4-hydroxyphenyl)propionate, 2, 4-bis-(n-octylthio)-6-(4-hydroxy-3, 5-di-t-butylanilino)-1, 3, 5-triazine, tetrakis(methylenedodecylthiopropionate)methane, distearyl thiopropionate, dimyristyl thiopropionate, and dilauryl thiopropionate.

7. The strippable semiconductive resin composition according to claim 1, which comprises: a silane-modified polymer prepared by reacting the polymer component (a) or (b) with a silane represented by the general formula RR'SiY$_2$ wherein R represents an olefinically unsaturated hydrocarbon group or a hydrocarbonoxy group; Y represents a hydrolyzable organic group; and R' represents R or Y in the presence of a compound capable of generating free radicals; and the conductive carbon black.

8. A crosslinked polyolefin-insulated wire and cable comprising: a conductor; an insulator layer for insulating the conductor; and an outer semiconductive layer provided directly in contact with the insulator layer, the outer semiconductive layer comprising a strippable semiconductive resin composition, the strippable semiconductive resin composition comprising
a polymer component (a), with a number average molecular weight of not less than $3 \times 10^4$ or a weight average molecular weight of not less than $3 \times 10^5$ and a melting point of 60° C. to 80° C., composed mainly of an ethylene/vinyl acetate copolymer, or a polymer component (b) composed mainly of 99 to 50 parts by weight of the ethylene/vinyl acetate copolymer and 1 to 50 parts by weight of a polyolefin having a melting point of 120° C. or above, and
conductive carbon black compounded with the polymer component (a) or (b), the strippable semiconductive resin composition having a volume resistivity of not more than 5000 Ω·cm at room temperature.

9. The wire and cable according to claim 8, wherein the polyolefin having a melting point of 120° C. or above in the strippable semiconductive resin composition is at least one member selected from the group consisting of high density polyethylene, linear polyethylene, and polypropylene.

10. The wire and cable according to claim 8, wherein the strippable semiconductive resin composition further comprises 1 to 20 parts by weight, based on 100 parts by weight of the polymer component (a) or (b), of a hydrocarbon wax having a volatile loss of less than 2% at 200° C.

11. The wire and cable according to claim 10, wherein the hydrocarbon wax in the strippable semiconductive resin composition is at least one member selected from the group consisting of high density polyethylene, medium density polyethylene, low density polyethylene, ethylene/vinyl acetate copolymer, ethylene/ethyl acrylate copolymer, and other ethylene polymers and polypropylene, said polymers having a molecular weight of not more than 10,000.

12. The wire and cable according to claim 8, wherein the strippable semiconductive resin composition further comprises an antioxidant having a volatile loss of less than 2% at 200° C.

13. The wire and cable according to claim 12, wherein the antioxidant is at least one member selected from the group consisting of 2,2-thio-diethylenebis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-(n-octylthio)-6-(4-hydroxy-3,5-di-t-butylanilino)-1,3,5-triazine, tetrakis(methylenedodecylthiopropionate)methane, distearyl thiopropionate, dimyristyl thiopropionate, and dilauryl thiopropionate.

14. The wire and cable according to claim 8, wherein the strippable semiconductive resin composition comprises: a silane-modified polymer prepared by reacting the polymer component (a) or (b) with a silane represented by the general formula RR'SiY$_2$ wherein R represents an olefinically unsaturated hydrocarbon group or a hydrocarbonoxy group; Y represents a hydrolyzable organic group; and R' represents R or Y in the presence of a compound capable of generating free radicals; and the conductive carbon black.

15. The wire and cable according to claim 8, wherein the insulator layer comprises a resin composition comprising a silane-modified polyolefin prepared by reacting a polyolefin with a silane represented by the general formula RR'SiY$_2$ wherein R represents an olefinically unsaturated hydrocarbon group or a hydrocarbonoxy group; Y represents a hydrolyzable organic group; and R' represents R or Y in the presence of a compound capable of generating free radicals, the silane-modified polyolefin having been crosslinked as a result of contact with water in the presence of a silanol condensation catalyst.

* * * * *